Nov. 6, 1962

D. K. HAWKINS 3,061,945

DATA FLOW EVALUATOR AND TRAINER

Filed Sept. 15, 1960

INVENTOR
DONALD K. HAWKINS

BY *James B. Boyer*

ATTORNEY

Nov. 6, 1962

D. K. HAWKINS 3,061,945

DATA FLOW EVALUATOR AND TRAINER

Filed Sept. 15, 1960

INVENTOR
DONALD K. HAWKINS

BY *James N. Boyer*

ATTORNEY

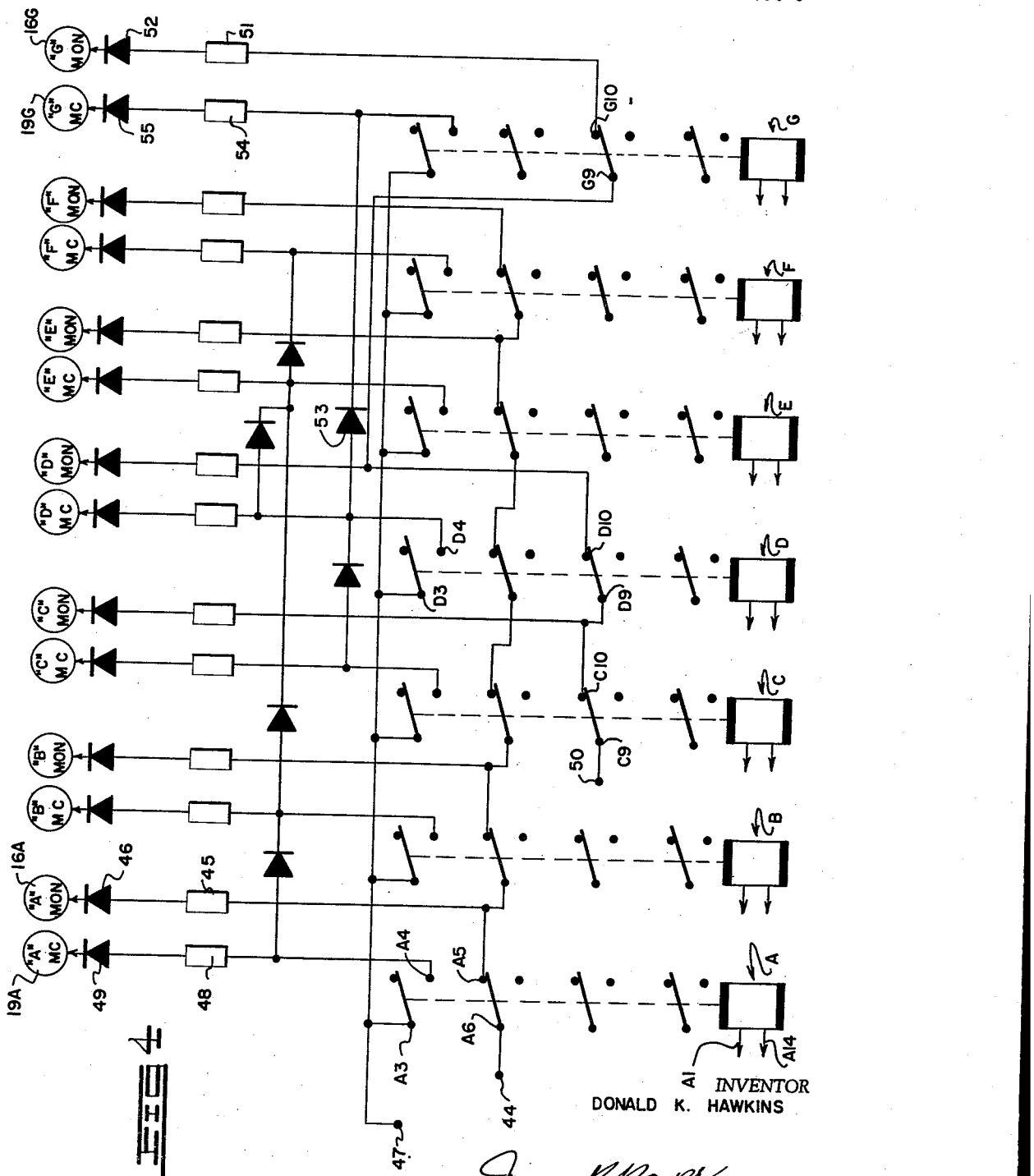

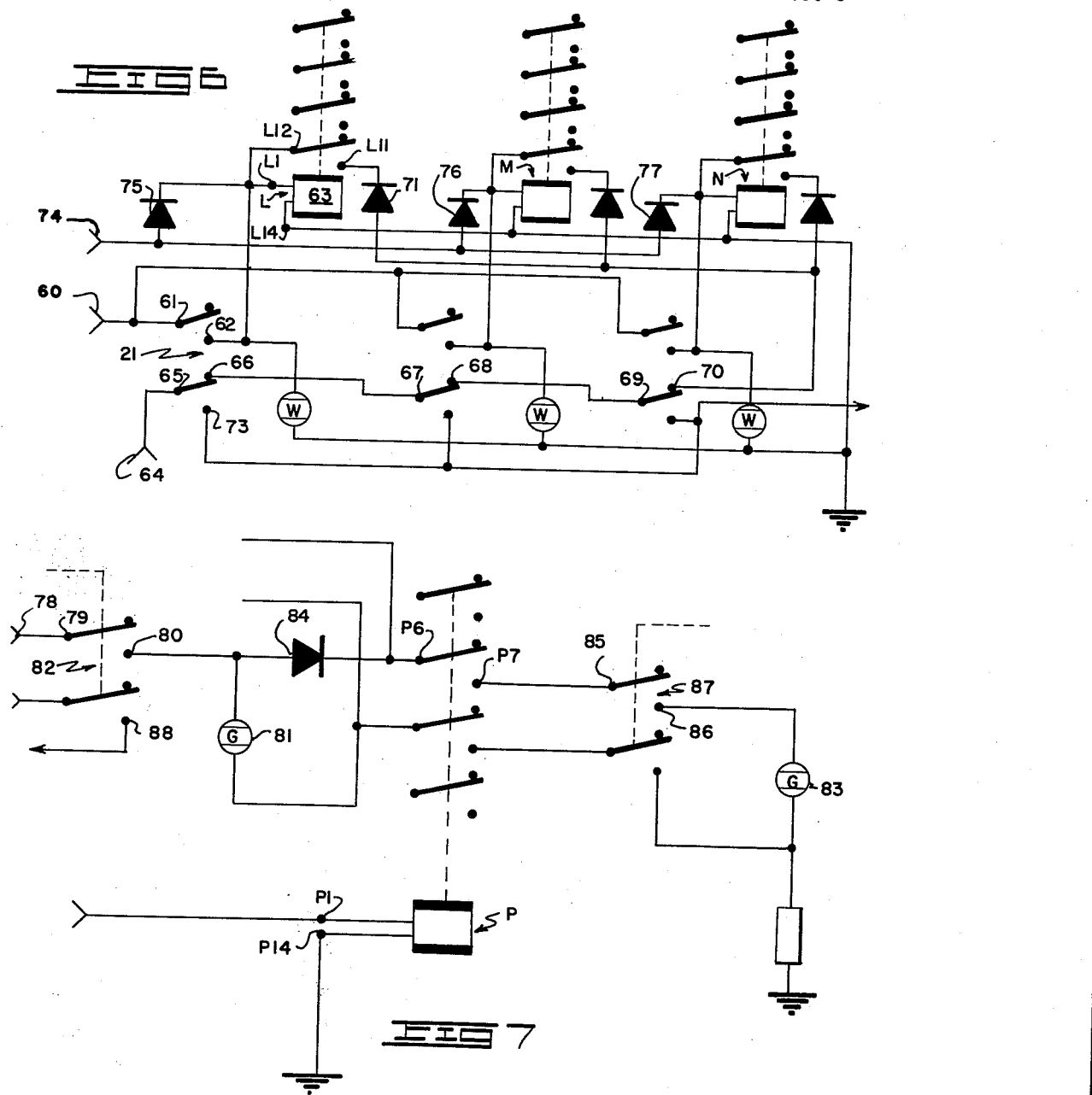

United States Patent Office 3,061,945
Patented Nov. 6, 1962

3,061,945
DATA FLOW EVALUATOR AND TRAINER
Donald K. Hawkins, College Park, Md., assignor to ACF Industries Incorporated, New York, N.Y., a corporation of New Jersey
Filed Sept. 15, 1960, Ser. No. 56,187
9 Claims. (Cl. 35—13)

Control systems for many modern weapons have been developed to a state of complexity prohibitive of general use of actual apparatus for training in the art and logic of malfunction analysis. My invention provides improved training apparatus in which the inter-relationships between various units which comprise a system are displayed and problems in trouble shooting may be set in by an instructor and solved by a trainee as an aid to instruction in system logic.

The guidance of a rocket over a long flight and trajectory has required development of systems of considerable complexity. Not the least of the problems attendant thereon is the training of in-line mechanics to effectively service and maintain such guidance systems. Classroom instruction and practical experience on a bench mockup of a system, while providing familiarization with basic features, have been found inadequate for training in the art of trouble shooting. In general, classes are too large for individual practice with a limited number (usually one) of operative systems. Then too, practical experience has shown that malfunctions arbitrarily inserted by an instructor for one class may not be removed in time for the next. These, compounded with malfunctions introduced by the students and those occurring naturally, make it difficult to maintain the equipment in a state of repair necessary for effective instruction in trouble shooting.

The problem of providing effective maintenance training has been greatly lessened by the use of replaceable components. Thus, in a typical guidance system, there may be many "black boxes" connected by cables which may be replaced without altering solder connections. In addition, many of these units carry replacement sub-units which also may be plugged in. With this compartmentation, field maintenance can often be accomplished by replacement of plug-in units, referring repair of those found defective to a repair center staffed by more highly specialized technicians.

With field maintenance accomplished by replacement of components as a whole, trouble shooting becomes a matter of correct analysis of system logic and thus of inter-dependency of various units. With my invention, practice in analyzing these relationships is possible with a trainer system simulator. It is essentially a digital computer set up to read out in terms of components of a system which would become inoperative or marginally operative upon failure of one or more of the units which comprise the system. Problems may be set into the trainer with facility and even more quickly removed to prepare for a new problem. In a given instruction period, simulation and solution of a large number of problems is possible, thus providing much more practice for each member of a class.

Realization of the pedagogical advantages of logic training and evaluating equipment has led to prior attempts to develop systems of this type. These have been less than satisfactory however. The use of plug-in units on the trainer panel proved cumbersome and unnecessarily confusing. Profuse variety in probes, dangling leads, switches, push buttons, and indicator lamps created additional mental hazards for the trainee.

My invention provides a novel and useful solution to the problem of training in system logic. To eliminate the confused panel layout of the prior art, it is an object of my invention to combine the functions of switch actuator and condition indicator in a single box-shaped illuminated button. If that unit is to be replaced it is simply necessary to momentarily depress the button. Similarly shaped, but readily distinguishable buttons provide a measure of confidence to be placed in a given unit.

It is a further object of the invention to group those actuator-indicator buttons which are in physical proximity or in particular cabinets in the actual system with a corresponding proximity on the training board.

Still another object of the invention is the display of interconnections between units by flow lines visibly and colorfully marked on the panel.

It is still another object to facilitate rating of trainee proficiency by providing automatic count of the number of moves or replacements attempted in solution of a problem and a measure of the time required to make these replacements.

Ease and rapidity of insertion and clearing of a problem by the instructor is another objective achieved by practice of the invention.

It is, of course, essential that the trainer for evaluation of malfunction be itself consistantly free from malfunction. Attainment of this object of my invention is assured by use of fundamentally sound relay logic circuits and of the simplest possible interconnections compatible with the complexity of the actual system.

These and further objects of the invention will become fully evident in the detailed description to follow, taken in conjunction with the drawings, of which:

FIG. 4 shows a circuit for interconnecting the various units of FIG. 2 so as to obtain data flow in the manner there depicted;

FIG. 5 shows a circuit for cyclic energization of the marginal confidence indicators which are seen as flashing lights;

FIG. 6 shows a circuit for selecting a particular cabinet or set of units of the entire floor plan including also a provision for full display of all cabinets if desired; and FIG. 7 shows a circuit for insertion of test probes for either oscilloscope or test meter.

Figure 1:
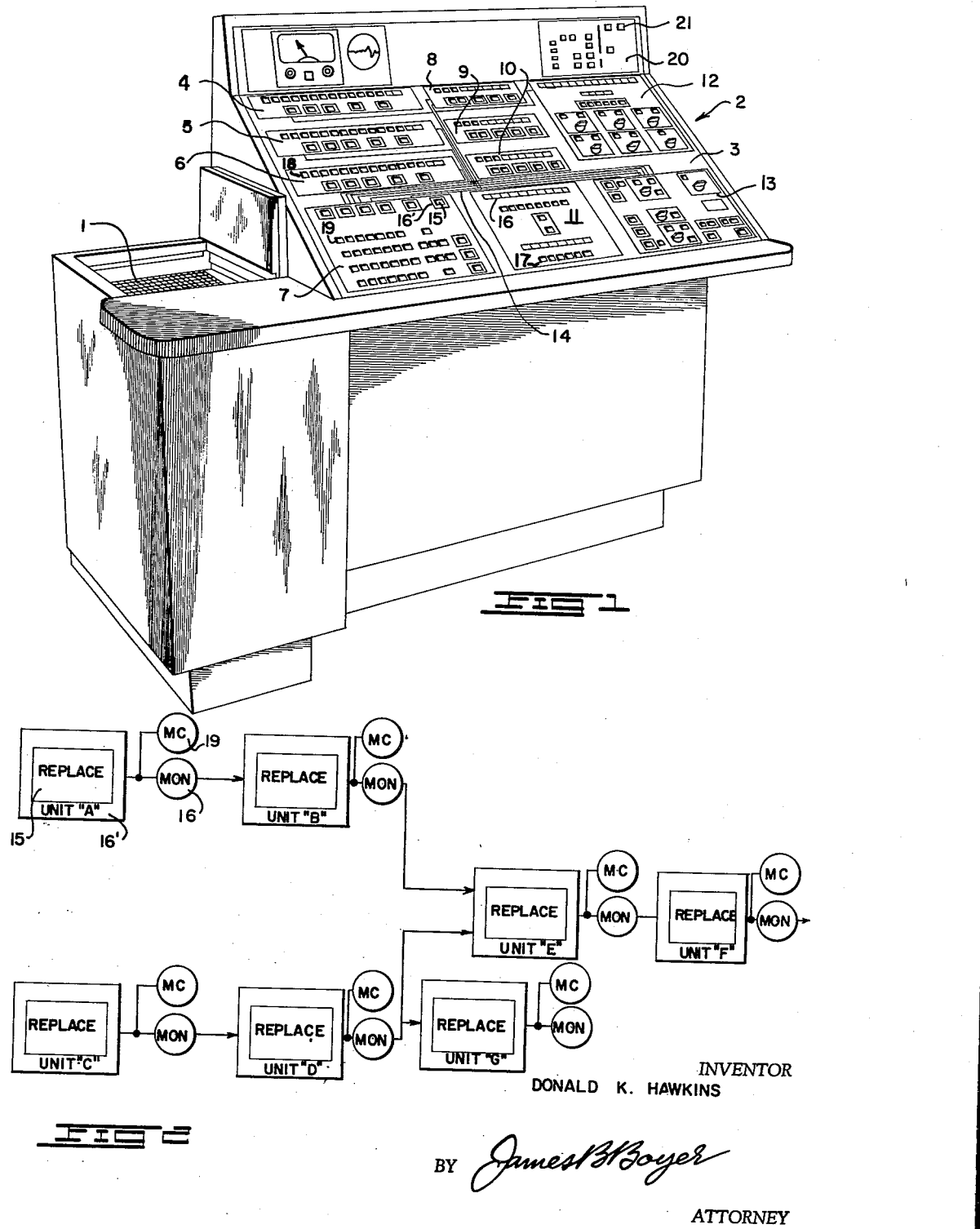
FIG. 1 shows a view in perspective of the console and cabinet of my trainer, the instructor's station being shown in the fore left with the trainee's display panel on the inclined board toward the rear right and a relay chassis area beneath.

Even when reduced to the most fundamental relationships between its many units, the logic of the electronic system may be exceedingly complex. It is imperative therefore that any display of these relationships to a student add nothing to this complexity. The display panel should represent the most uncluttered and orderly presentation of indicia, controls and interconnections which it is possible to devise. It is accordingly germane that the appearance and general layout shown in FIG. 1 be made a part of the description; it is of the essence in attaining the goals of the invention. Generally this console provides areas for an instructor's console 1, a display and control panel for the trainee 2, and adequate space inside for relay circuits and power supplies.

The signal flow pattern for the system to be represented is displayed in a multicolor block diagram on flat panel 3. The block diagram is broken down into cabinet areas, ten of which, 4, 5, 6, 7, 8, 9, 10, 11, 12 and 13, are shown by way of example in FIG. 1. Each cabinet represents a related group of equipment usually in physical proximity in the actual system. The components of a cabinet are broken down into sub-blocks representative of its largest replaceable units. These are correctly interconnected by flow lines 14 within the cabinet area as well as externally to units in other cabinet areas on the panel. In the present example, the replaceable units are represented by transulcent rectangular keys, such as 15, protruding out through correspondingly shaped apertures in the panel 3. Each key is boxed in by a bordering colored line for connection to the flow lines 14.

The simulated condition of a particular replaceable unit, such as 15, may be detected by various indicators provided on the display panel within each cabinet area. Proper operative condition is indicated by illumination of one or more of the following: confidence indicator light, such as 16; a status indicator light, such as 17; a monitor meter indicator, such as 18. If a unit is not operative a marginal confidence indicator, such as 19, will be flashing. If the diagnosis of evidence from these indicators suggests replacement of a unit, this is accomplished by simply depressing the key 15. The replacement will be indicated by illumination of the key and counted as one of the moves on the instructor's console 1.

As implied above, the cabinets which comprise an actual system will be physically separated one from another, usually occupying different sites in the floor plan of a trailer or a stationary or shipboard room. It is impractical to arrange the cabinets on the display panel 3 in relative position corresponding to the floor plan. Instead this is done on a reduced scale on a master or floor plan selector 20. Here switch units, typified by 21 in FIG. 1, corresponding to the various cabinets of the trainer, are arrayed in proper plan position. Depression of a switch unit applies power to the indicators of the particular cabinet selected by the student for examination. It is often not possible to contain areas representative of all of the cabinets in a complete system on a single display panel. These will normally be included in additional consoles similar to that shown in FIG. 1. The floor plan position of these extra cabinets will be indicated on the floor plan selector 20 by blocks drawn on the floor plan but referred to other consoles.

Various colors are used to enhance the clarity of the display panel. In this example: (1) the background of the panel 3 is a dark grey; (2) the individual cabinets and master floor plan are light grey; (3) the border lines 16′, about the replace keys 15, are green; (4) the flow lines 14 are orange; and (5) the lettering is black. This selection of colors provides satisfactory contrast but is not intended as a limitation of my invention. Other color schemes which would produce an equivalent clarification of the panel display lie within its scope.

The complete circuit assembly required to simulate inter-relationships between replaceable units of a given system will be characteristic only of that system. Because of this limited applicability it is preferred here to describe the basic circuits. With this description it should be possible for anyone skilled in the art to build up a complete trainer.

Figure 2:
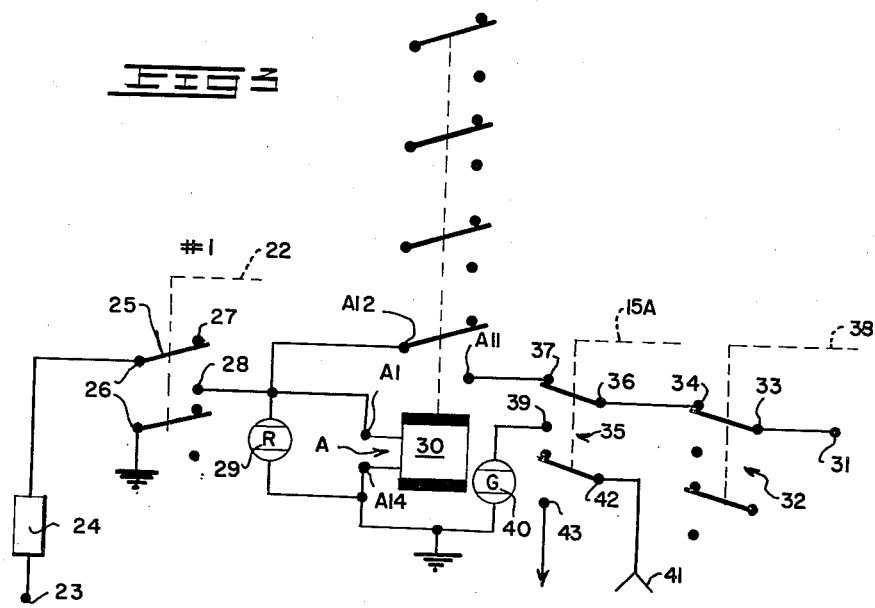
FIG. 2 shows a typical block layout of several units with interconnecting flow lines as they would be connected on the trainee display panel.

As a typical problem, consider the data flow diagram shown in FIG. 2. Seven replaceable units, A, B, C, D, E, F and G, are shown. In general, indication of proper functioning of a given unit is a statement that all units in the flow path preceding this unit are also functioning. For example, for the monitor indicator associated with B to be illuminated, both A and B units must be operative; for E to be illuminated, A, B, C, D and E must be operative; for G to be illuminated, C, D and G must be operative. Obviously since only a yes or no answer is required of each unit, binary type computer circuits are suggested. Relay circuits provide adequate speed for this case since it is only necessary for the trainer to operate more rapidly than the trainee.

Figure 3:
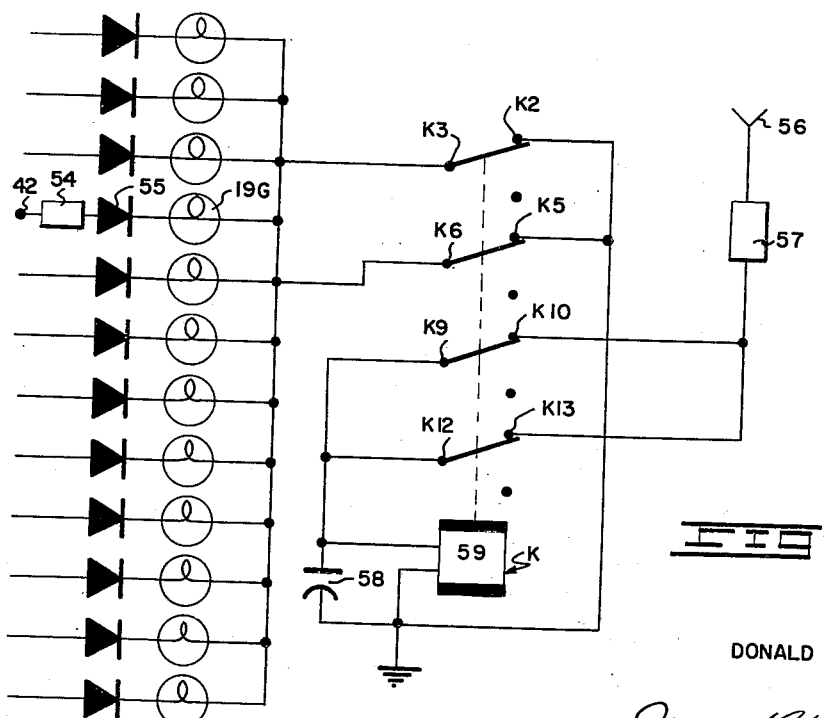
FIG. 3 shows a relay circuit for insertion of a malfunction indication by the instructor and for its removal by student or instructor.

A suitable circuit for insertion of a malfunction and for replacing a defective unit is shown in FIG. 3. Relay unit A shown in its normal position is actuated by depression of malfunction #1 insert key 22 which is located in the key matrix of instructor's console 1. With actuation of switch 25, electrical current from source 23 flows through resistor 24, contacts 26 to 28, terminals A1 and A14 to ground to energize relay coil 30. Relay unit A is held on by energization from electrical source 31 through normally closed (NC) contacts 33 and 34 of reset switch 32, NC contacts 36 and 37 of unit A replace switch 35, contacts A11 and A12 to A1 of relay coil 30.

The instructor's console provides a record of the malfunctions which have been inserted but not yet removed by illumination of each key depressed in setting up the problem. Thus red lamp 29 across relay terminals A1 and A14 would be illuminated beneath key 22. It would be extinguished upon release of relay A by replacement of this unit by the trainee in depressing key 15A or by depression of reset key 38 by the instructor.

Each replace key, typified by 15A, is illuminated while it is depressed by energization of green lamp 40 through contacts 36 and 39 of replace switch 35. At the same time, the replace move is tallied at a counter (not shown) on the instructor's console 1 by energization from electrical source 41 through contacts 42 and 43 of replace switch 35.

A relay circuit providing the functional interdependencies indicated by the flow diagram of FIG. 2 is shown in FIG. 4. A relay unit is provided to correspond to each replaceable unit. Each relay unit is provided with circuitry for its actuation indicative of malfunction insertion from the instructor's console by use of the standard circuit of FIG. 3. For energization of a given monitor indicator it is necessary that a series circuit be completed through normally closed contacts on each of the unit relays which precede the given replace unit relay on the flow chart. However, if one relay in this train is actuated (to simulate a malfunction) marginal confidence indicators on it and on all units subsequent to it in the flow chart must be actuated. That these conditions are provided by the circuit of FIG. 4 is apparent. Consider for example a case in which monitor indicator 16A is illuminated. Since nothing precedes it in the flow chart (FIG. 2) this indicates only that unit A relay is not actuated. Thus energization of monitor indicator lamp 16A is provided from source 44 through NC contacts A6 and A5 of unit A relay through resistor 45 and diode 46. If this relay is actuated, however, contact with terminal A5 is broken extinguishing 16A and turning on instead marginal confidence indicator 19A by energization from source 47 through A3, A4, resistor 48 and diode 49.

As a less trivial case consider the meaning of illumination of the G monitor indicator 16G. Since it is preceded in the flow diagram by C and D both of these, as well as unit G relay must be in deactuated condition. This combination is indicated by energization of monitor indicator 16G from source 50 through terminals C9, C10, D9, D10, G9 and G10, resistor 51 and diode 52. Actuation of any one of these relays C, D or G will cause energization of marginal confidence indicator 19G. For example, if malfunction in unit D is inserted, indicator 19G will be energized from source 47 through terminals D3 and D4, diode 53, resistor 54 and diode 55. The diodes such as 53 in the marginal confidence circuits prevent backflow of current to indicators preceding a given point in the flow chart.

It is desirable to draw attention to the failure of a given unit by a flashing light in the marginal confidence indicator. A suitable circuit for chopping the direct current source is shown in FIG. 5. It is essentially a relaxation oscillator utilizing a capacitor charged through a current limiting resistance, then disconnected and discharged by actuation of a relay when sufficient voltage level has been reached in the capacitor. Thus capacitor 58 is charged from source 56, through resistor 57, terminals K10, K9 paralleled by K13 and K12. As the voltage builds up across capacitor 58, marginal confidence indicators such as 19G are energized by completion of a path to ground from source 42 (FIG. 4), resistor 54, diode 55, NC contacts K6 and K5 paralleled by K3 and K2 to ground. When sufficient voltage is reached, relay K is actuated and held on while capacitor 58 discharges through relay coil 59. Concurrently, the charging current is removed by opening contacts K10 and K13 and marginal confidence indicator 19G is extinguished by opening the path to ground through contacts K2 and K5. When capacitor 58 discharges sufficiently to release relay K, the cycle starts anew. A value for resistor 57 of 200 ohms and for capacitor 58 of 650 microfarads has been found satisfactory. A plurality of indicators would be served by the same flasher circiut as denoted by the multiple diodes and indicator lamps in FIG. 5.

Selection of a particular cabinet for evaluation from the floor plan panel 20 may be accomplished by means of the circuit shown in FIG. 6. A particular cabinet may be selected by depressing one of the block switches, such as 21, located in the system plan position chart. In this event, relay L will be energized from source 60, through terminals 61, 62, L1, relay coil 63 and terminal 14, returning to ground. The relay will hold on with a release time lag sufficient to permit it to be held on after switch 21 is released by connection from source 64 through terminals 65, 66, 67, 68, 69, 70, diode 71, contacts L11 and L12. Indicator lamp, energized from source 60 while switch 21 is depressed, continues to glow as relay L is held on by virtue of its connection established to terminal L1. Suitable terminals of the relay switch provide energization for the appropriate cabinet display.

If another cabinet is selected for analysis, the hold circuit is broken and the new cabinet relay is actuated and held on. Each cabinet selection is counted on the instructor's console by connection through a normally open contact of a select switch, such as contact 73 of switch 21.

As a special feature, this trainer permits the instructor to energize all cabinets simultaneously. This is accomplished in the circuit of FIG. 6 by applying a voltage source 74, switched on from the instructor's console, simultaneously to relays L, M and N, respectively, through diodes 75, 76 and 77.

In the actual system, there will normally be a number of test points which may be probed with an oscilloscope or test meter. This operation is implemented in the present trainer by use of the circuit shown in FIG. 7. Before any probe indication can be obtained the cabinet must be energized by its selection on the floor plan 20. If this condition is met, relay P will be actuated by connection through terminals P1 and P14. The signal at point 78 may then be indicated by test indicator lamp 81 through its connection through contacts 79 and 80 of test point switch 82. Simulation of an oscilloscope test on this signal may be provided by energization of scope indicator lamp 83 through diode 84, terminals P6, P7, 85 and 86 of scope test switch 87. Signals from other cabinets and from other points in the same cabinet may be inserted in the test circuit as noted in FIG. 7. Each test with either test meter or scope is recorded on the test counter by its energization through terminal 88.

Typical operation of this device as an evaluator may proceed as follows. The normal condition of the front panel is to have all monitor indicators illuminated, all marginal confidence indicators 19 out, and all test indicators 81 and 83 out, except when the proper selector switch and/or test switch is activated. The instructor can remove all the indications from the front panel by momentarily depressing reset switch 32 of FIG. 3.

The instructor can insert a malfunction by momentarily depressing a malfunction switch, such as 25. The equipment has then been programmed, but the front panel indicators will remain out until the instructor momentarily depresses the start button. The console area now is illuminated according to the programmed malfunction. An elapsed time indicator (not shown) begins to run.

The student now analyzes the information presented at the console and makes any desired tests that are possible at the console, each test being counted on the test counter (not shown). The student must select the cabinet in which the malfunction is most likely to be located by momentarily depressing the correct cabinet floor plan switch or selector 20. This simulates walking from the console to the selected cabinet and thus is properly counted as a test by the test counter. All console indicators are turned out except the selected cabinet area which is illuminated according to the programmed malfunction.

The student can now analyze the information presented at the selected cabinet and make any tests that are possible at this cabinet. If the student can isolate the malfunction to a replaceable unit in this cabinet he replaces the suspected unit by momentarily depressing its replace switch. The instructor's replace counter counts the number of units replaced by the student. If this unit satisfies the programmed malfunction the malfunction program is removed returning the equipment to its normal condition. The instructor's elapsed time indicator stops indicating the length of time the student has taken to solve this particular malfunction problem. The instructor can now momentarily depress the reset switch clearing the counters, clock and flow panel. A new malfunction may now be programmed.

The instructor may program any number of malfunctions at one time. The student then is required to replace all of the defective units. The displayed information pertaining to each particular malfunctioned unit is cleared as that unit is replaced. All other abnormal indications are retained until the appropriate unit is replaced.

To use the equipment for training purposes the instructor momentarily depresses the desired malfunction switch, then the full display switch, and the start switch. The entire display panel is now illuminated showing the programmed display set up by the inserted malfunction. The instructor now can point out the various areas showing abnormal indications to the student. Any comments or special instructions may be given at this time to better acquaint the student with the inserted malfunction and the proper maintenance procedures to be used to locate the defective unit or units.

What I claim is:

1. A device for training in the logic of evaluation and of malfunction analysis of an electromechanical control system including a problem insertion console for use by an instructor, a trainee console for display of the problem including a plan area representative of the position of each cabinet in the actual control system, a plurality of cabinet selecting switches within said plan area each representative of a cabinet of the system, a corresponding plurality of cabinet areas each containing replace means and condition indicia means corresponding to each replaceable unit represented by one of said cabinet areas, means for supplying power to the condition indicia means of each cabinet area through the selecting switch corresponding to that cabinet area, visible flow lines interconnecting said replace means of each cabinet area and other cabinet areas representing the system so as to display corresponding interdependencies existent in the actual control system, and circuitry interconnecting said replace means so as to provide the interdependency indicated by said flow lines, means at said problem insertion console for selectively inserting a malfunction condition in any of said replace means, whereby said indicia means simulated by display failure of each unit which would be adversely affected by the inserted malfunction, and said replace means permit selective simulated replacement of any unit considered by the trainee to be of malfunction condition.

2. A device as in claim 1 wherein said replace means relevant to a replaceable unit includes a push button switch, a relay switch actuated by said push button switch, a holding circuit for said relay switch, and wherein said interconnecting circuitry is connected through contacts of said relay.

3. A device as in claim 2 including means for simultaneously releasing the holding circuit for each relay switch, whereby the problem can be cleared from the consoles.

4. A device as in claim 2 wherein said push button switch is illuminated during its actuation.

5. A device as in claim 1 wherein both said replace means and said condition indicia means corresponding to each replaceable units are rectangular boxes of translucent material of comparable dimensions and shape.

6. A device as in claim 1 wherein said condition indicia means corresponding to each replaceable unit includes a marginal confidence indicator which is intermittently illuminated to indicate malfunction of the replaceable unit.

7. A device as in claim 1 wherein said condition indicia means corresponding to each replaceable unit includes a confidence indicator which is illuminated to indicate satisfactory condition of the replaceable unit.

8. A device as in claim 1 wherein operation of any of said push actuated switches within said plan area energizes circuitry relevant to its corresponding cabinet area and deenergizes that relevant to all other cabinet areas of the system.

9. A device as in claim 8 including means to simultaneously energize all cabinet areas of the system.

References Cited in the file of this patent

UNITED STATES PATENTS 2,815,484    Bulliet et al. _____ Dec. 3, 1957